United States Patent [19] [11] 3,924,135
Dhar et al. [45] Dec. 2, 1975

[54] DIRECT-RESPONSE ULTRAVIOLET DOSIMETER UTILIZING THERMOLUMINESCENT MAGNESIUM OXIDE

[75] Inventors: Ashok K. Dhar, Niles, Ill.; Larry A. DeWerd; Thomas G. Stoebe, both of Seattle, Wash.

[73] Assignee: The United States of America as represented by the Secretary of the Department of Health, Education and Welfare, Washington, D.C.

[22] Filed: Nov. 26, 1974

[21] Appl. No.: 527,280

[52] U.S. Cl. ............... 250/484; 250/337; 250/372
[51] Int. Cl.² ........................................... G01T 1/11
[58] Field of Search ................. 250/372, 337, 484

[56] References Cited
UNITED STATES PATENTS

| | | | |
|---|---|---|---|
| 3,388,252 | 6/1968 | Medlin | 250/337 |
| 3,769,510 | 10/1973 | Kotera et al. | 250/484 X |
| 3,772,206 | 11/1973 | Hitomi et al. | 250/337 X |

*Primary Examiner*—Archie R. Borchelt
*Attorney, Agent, or Firm*—Browdy and Neimark

[57] ABSTRACT

The thermoluminescent dosimeter which responds directly to ultraviolet radiation uses magnesium oxide thermoluminescent crystals which respond to ultraviolet radiation without the need for prior irradiation by X-ray and annealing.

6 Claims, 2 Drawing Figures

DIRECT-RESPONSE ULTRAVIOLET DOSIMETER UTILIZING THERMOLUMINESCENT MAGNESIUM OXIDE

FIELD OF THE INVENTION

The present invention relates to a thermoluminescent dosimeter system and, more particularly, to a MgO thermoluminescent disometer which responds directly to ultraviolet radiation. This system employs crystals of magnesium oxide.

BACKGROUND OF THE INVENTION

Thermoluminescent crystals may operate as a dosimeter for various types of radiation depending on the material of the crystal by giving off a luminescent output proportional to the amount of a type of radiation to which the crystal is responsive and to which the crystal has been exposed, when the crystal is heated subsequent to the exposure to the irradiation. This thermoluminescent property provides an excellent dosimetry system due to the ease with which the exposure may be measured subsequent thereto and also due to the characteristics of the thermoluminescent crystal which is a luminescent output proportional to the total integrated dose of the particular irradiation to which the crystal has been exposed.

Thermoluminescent dosimetry for detecting and measuring ionizing radiation is well known noting, e.g., the patents to Durkee et al. U.S. Pat. No. 3,229,097; Forsman et al., U.S. Pat. No. 3,243,590. Thermoluminescent dosimetry for ultraviolet radiation is also well known, noting, e.g., the patent to Buckman et al., U.S. Pat. No. 3,728,543.

The patent to Buckman et al., U.S. Pat. No. 3,728,543, discloses a thermoluminescent dosimeter responsive to ultraviolet radiation. The dosimeter uses a crushed powder made of nominally pure sapphire (aluminum oxide). While the dosimeter of Buckman et al has some advantages in that it is a direct response ultraviolet dosimeter; nevertheless, the use of sapphire powder creates certain drawbacks.

Thus, Buckman et al show that the lowest exposure to which their device is sensitive is approximately 600 $\mu$ joule/cm$^2$, with a linear response of up to approximately 6000 $\mu$ joule/cm$^2$.

In measuring ultraviolet radiation doses for prevention of erythema and conjunctivitis, the minimum erythemal dose (MED) is an important factor in the desired measurements. MED occurs at approximately 30,000 $\mu$ joule/cm$^2$. It is important therefore to have an ultraviolet dosimeter which gives a linear response over a wider range than that shown in Buckman et al and is inclusive of at least MED. Obviously, it would be even more desirable to have a dosimeter which is linear in response to doses greatly exceeding MED.

In addition, the ultraviolet wavelengths of concern for erythema and conjunctivitis are in the range of 250 nm to 320 nm. It is therefore important that the response of the ultraviolet dosimeter being used is not affected by a change in wavelength over at least a range of approximately 250 nm to 350 nm. The patent to Buckman et al. does not disclose a wavelength response relationship.

Buckman et al disclose the use of powder, nominally pure sapphire (aluminum oxide). However, for greater ease on construction, handling and use of the ultraviolet dosimeter, it would be more desirable to use a material which is in bulk rather than powder form.

Except for the disclosure of Buckman et al, the only thermoluminescent systems proposed for ultraviolet radiation dosimetry to date have been of the indirect type. In order to use these, one must first irradiate the dosimeter crystal with X-rays or other ionizing radiation and then anneal the crystal to prepare it for ultraviolet radiation. This irradiation or annealing must be performed subsequent to each measurement of the exposure of the crystal to ultraviolet radiation.

One of the great advantages of the direct response thermoluminescent dosimeter is that it is not necessary to treat the thermoluminescent material by irradiating it between uses in order to prepare the material for being responsive to ultraviolet radiation.

Annealing, however, has invariably been believed necessary to further prepare the crystal for ultraviolet radiation response. Although the patent to Buckman et al is not entirely clear as to the necessity of annealing between each use of the thermoluminescent sapphire powder therein disclosed, Buckman et al do imply that an annealing at 400°C. is required for each reuse of the sapphire power. It would be desirable to have a material which is directly responsive to ultraviolet radiation without the necessity of irradiation and/or annealing between each use thereof for measuring ultraviolet radiation.

SUMMARY OF THE INVENTION

It is therefore an object of the present invention to overcome the defects of the prior art, such as indicated above.

It is another object to provide for improved thermoluminescent dosimetry.

It is another object to provide a direct response ultraviolet dosimeter system employing a thermoluminescent crystal which has a linear response between a lowest measurable exposure of approximately 1 $\mu$ joule/cm$^2$ to approximately 100,000 $\mu$ joule/cm$^2$.

It is a further object of the present invention to provide a direct response ultraviolet dosimeter system employing thermoluminescent crystals which have a response which is independent of the wavelength of the ultraviolet radiation being measured over a range of at least 250 nm to 320 nm.

It is an additional object of the present invention to provide a direct response ultraviolet dosimeter system employing thermoluminescent crystals which are in crystal or other bulk form.

It is still a further object of the present invention to provide a direct response ultraviolet dosimeter system employing thermoluminescent crystals which do not require either irradiation or annealing between subsequent uses thereof for the measurement of ultraviolet radiation.

The present invention accomplishes the above objects by the use of thermoluminescent magnesium oxide crystals in a direct response ultraviolet radiation dosimeter.

BRIEF DESCRIPTION OF THE DRAWING

The present invention can be more fully understood by reference to the detailed description of an embodiment of the invention and by reference to the drawing wherein.

DETAILED DESCRIPTION OF THE INVENTION

Magnesium oxide has been found to be highly sensitive in the erythemal or sunburn region of the ultraviolet spectrum (wavelengths of 290 nm to 320 nm). The thermoluminescent sensitivity depends upon the purity of crystals and the thermal history of the crystals. In the case of magnesium oxide crystals an initial annealing is required at about 2,000°C. in a reducing atmosphere. The samples, however, require no further annealing treatments after repeated uses. Thus, nominally pure magnesium oxide crystals show a very high response after the initial annealing and for subsequent uses without necessity of further annealing. Magnesium oxide crystals further show a response independent of wavelength in the erythemal region and have an essentially linear response over approximately six decades of exposure from approximately 1 $\mu$ joule/cm$^2$ to 100,000 $\mu$ joule/cm$^2$.

The magnesium oxide materials used in the present invention include high purity single crystals and nominally pure crystals, e.g., those obtained from the Norton Company. These crystals include certain impurities as shown in Table I. Of these crystals the crystal designated NA has been shown to have the best thermoluminescent response with the desired characteristics of linearity and wavelength independence.

TABLE I

Spectrographic Analysis of PA, NA, NB and NC Crystals

|  | PA | NA | NB | NC |
|---|---|---|---|---|
| MgO | Principal constituent in each sample | | | |
| Fe | <.005% | 0.02% | .015% | 0.01% |
| Si | .007 | .01 | .007 | .015 |
| Mn | <.001 | .002 | .002 | <.001 |
| Al | .007 | .02 | .05 | .07 |
| Cu | .0005 | .0005 | .0005 | <.0005 |
| Ca | .005 | .015 | .007 | .25 |

The crystals are preferably treated before usage. Thus the crystals are initially annealed by heating them at 2,000°C in a reducing atmosphere for 2 hours. Next, the crystals may be exposed to whole ultraviolet (mixed wavelengths from a xenon lamp) for 15 minutes prior to initial use. when this is done, the crystals show a higher sensitivity in response to ultraviolet radiation. This initial exposure, however, need not be repeated for subsequent use.

The magnesium oxide crystals of the present invention may be crushed and used in powder form. However, it is more desirable to use the crystals in a dosimeter in the single crystal form. In addition, the crystals may be crushed and pressed into pressed blocks. Magnesium oxide in this solid crystal or pressed block form is preferred over powders for ease of handling.

Figure 1:
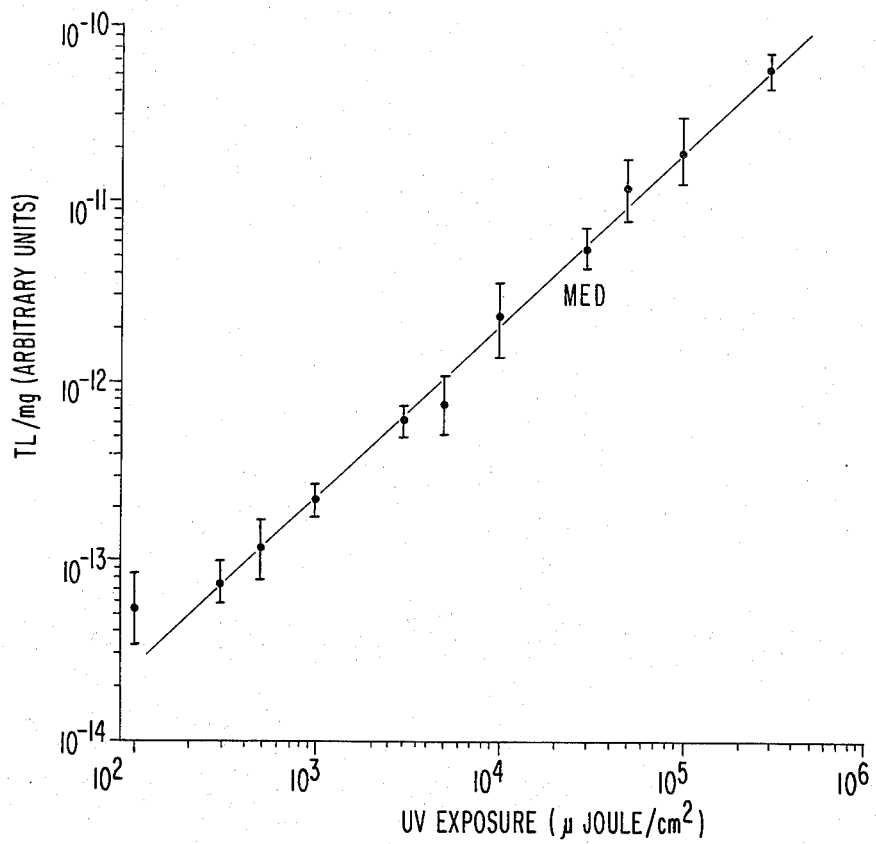
FIG. 1 shows the thermoluminescent response of magnesium oxide crystals as a function of ultraviolet radiation exposure.

FIG. 1 shows the thermoluminescent response in arbitrary units of thermoluminescence per milligram of NA crystals as a function of ultraviolet radiation exposure. It can be seen from FIG. 1 that the response of the NA crystals is approximately linear over the range of exposure shown in FIG. 1 (100–100,000 $\mu$ joule/cm$^2$). It has also been shown that the response of the NA crystals is linear down to an exposure of 1 $\mu$ joule/cm$^2$.

Figure 2:
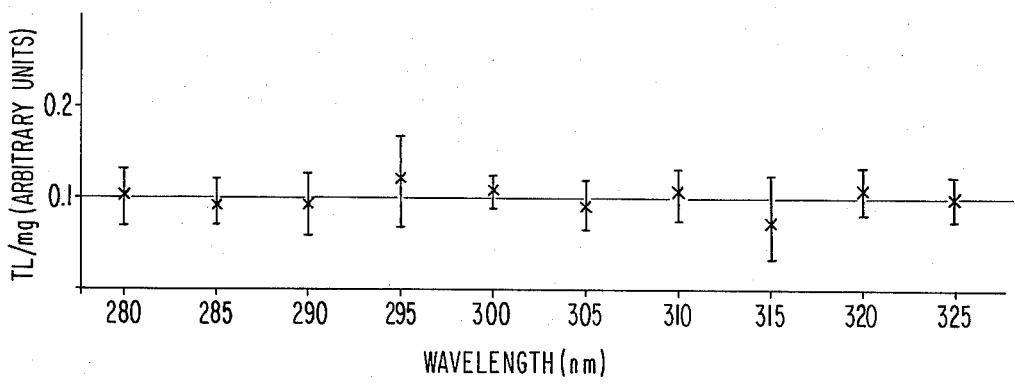
FIG. 2 shows the thermoluminescent response of magnesium oxide crystals as a function of wavelength of the ultraviolet radiation to which the crystal is exposed.

FIG. 2 shows the thermoluminescent response in arbitrary units of thermoluminescence per milligram of the NA crystals as a function of the wavelength of the irradiation. This shows that thermoluminescent response of the magnesium oxide crystals of the present invention is essentially constant over a spectrum of 280 nm – 330nm. This is the essential erythemal region of the spectrum. It has also been shown that the response of the magnesium oxide crystals is essentially constant down to the wavelength of 250 nm.

It will be understood that the disclosure of the present invention is intended to be illustrative of a preferred embodiment of the present invention and is not intended to limit the present invention beyond the scope of the following claims.

What is claimed is:

1. A direct response thermoluminescent dosimeter responsive to ultraviolet radiation consisting essentially of nominally pure magnesium oxide.

2. The dosimeter of claim 1 wherein said nominally pure magnesium oxide is crystalline.

3. The dosimeter of claim 1 wherein said nominally pure magnesium oxide is in the form of a pressed block.

4. A method of detecting and measuring ultraviolet radiation comprising the steps of:

exposing nominally pure magnesium oxide to incident ultraviolet radiation;

thereafter heating the exposed magnesium oxide thereby causing said magnesium oxide to undergo thermoluminescence; and measuring the luminescence resulting from said thermoluminescence.

5. The method of claim 4 wherein said nominally pure magnesium oxide is crystalline.

6. The method of claim 4 wherein said nominally pure magnesium oxide is in the form of a pressed block.

* * * * *